(12) United States Patent
Kamishiro

(10) Patent No.: US 9,491,158 B2
(45) Date of Patent: Nov. 8, 2016

(54) AUTHENTICATION SYSTEM, AUTHENTICATION METHOD, INFORMATION PROCESSING APPARATUS

(71) Applicant: Daisuke Kamishiro, Kanagawa (JP)

(72) Inventor: Daisuke Kamishiro, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/556,588

(22) Filed: Dec. 1, 2014

(65) Prior Publication Data

US 2015/0172268 A1 Jun. 18, 2015

(30) Foreign Application Priority Data

Dec. 18, 2013 (JP) .................................. 2013-261572

(51) Int. Cl.
*H04L 29/06* (2006.01)

(52) U.S. Cl.
CPC ............. *H04L 63/08* (2013.01); *H04L 63/105* (2013.01)

(58) Field of Classification Search
CPC combination set(s) only.
See application file for complete search history.

(56) References Cited

U.S. PATENT DOCUMENTS

| 7,694,295 | B2 * | 4/2010 | Greenberg | .......... G06F 9/44505 345/547 |
| 8,863,263 | B2 * | 10/2014 | Asano | ................. H04L 63/0815 709/203 |
| 8,935,288 | B2 * | 1/2015 | Vedula | .......................... 707/783 |
| 9,110,617 | B2 * | 8/2015 | Matsuda | ............... G06F 3/1273 |
| 2013/0347097 | A1 * | 12/2013 | Pan | ......................... G06F 21/31 726/17 |

FOREIGN PATENT DOCUMENTS

JP 2007-043515 2/2007

* cited by examiner

*Primary Examiner* — Beemnet Dada
(74) *Attorney, Agent, or Firm* — Harness, Dickey & Pierce, P.L.C.

(57) ABSTRACT

An authentication system includes a device; and an information processing apparatus connected to the device. The device includes a state management unit that manages an authentication state in the device and causes the device to enter a log-out state; and a first communication unit that transmits an authentication scheme available in the device to the information processing apparatus when the device enters the log-out state. The information processing apparatus includes a second communication unit that receives the authentication scheme; a generation unit that generates a log-in screen based on screen setting information corresponding to the received authentication scheme; and a display controller that controls to display the log-in screen on a display unit.

20 Claims, 6 Drawing Sheets

FIG.4

```
<screen id="SCREEN">
    <backgroundColor>#FFFFFF</backgroundColor>
</screen>
<image id="MAIN_IMAGE" enable="true">
    <x>200</x>
    <y>140</y>
    <fileName>logo.jpg</fileName>
</image>
<button id="MANUAL_LOGIN_BUTTON">
    <x>76</x>
    <y>366</y>
    <width>200</width>
    <height>40</height>
    <icon>
        <iconFile>
            <enabledIconFileName>manual.jpg</enabledIconFileName>
        </iconFile>
    </icon>
</button>
<button id="PIN_LOGIN_BUTTON">
    <x>300</x>
    <y>366</y>
    <width>200</width>
    <height>40</height>
    <icon>
        <iconFile>
            <enabledIconFileName>pin.jpg</enabledIconFileName>
        </iconFile>
    </icon>
</button>
```

AUTHENTICATION SYSTEM, AUTHENTICATION METHOD, INFORMATION PROCESSING APPARATUS

CROSS-REFERENCE TO RELATED APPLICATION

The present application claims priority to and incorporates by reference the entire contents of Japanese Patent Application No. 2013-261572 filed in Japan on Dec. 18, 2013.

BACKGROUND OF THE INVENTION

1. Field of the Invention

The present invention relates to an authentication system, an authentication method, and an information processing apparatus.

2. Description of the Related Art

Authentication control of authenticating user information input through an operation panel provided on an image forming apparatus and controlling the image forming apparatus such that the image forming apparatus is made into a log-in state or a log-out state has been known.

A terminal including an operating system (OS) is used as the operation panel of the image forming apparatus in some cases. In such a case, the following problems occur in the authentication control.

For example, the terminal itself does not control the log-in state and each of a plurality of applications installed on the terminal controls the log-in state. In this case, each application is required to detect whether the current image forming apparatus is in the log-in state or the log-out state and perform display control of a log-in screen. For these requirements, a mechanism for the log-in control needs to be developed for each application. Furthermore, when each application controls the log-in state, a type of the application that is displayed on a home screen cannot be adjusted in accordance with information of a user who logs in.

On the other hand, when the terminal controls the log-in state, deviation occurs between a period that the terminal manages as the log-in state and a period that the image forming apparatus manages as the log-in state in some cases. This deviation occurs because the image forming apparatus uniquely executes a power consumption mode, time-out processing, and the like.

A technique of converting an operation screen for the operation panel provided on the image forming apparatus to an operation screen for an operation panel provided on another image forming apparatus and displaying it has been disclosed (for example, see Japanese Patent Application Laid-open No. 2007-043515).

Also with the technique disclosed in Japanese Patent Application Laid-open No. 2007-043515, when the information processing apparatus such as the terminal including the OS is used as the operation panel of the device such as the image forming apparatus, the above-mentioned problems occur in the authentication control. That is to say, conventionally, when the information processing apparatus such as the terminal including the OS is used as the operation panel, authentication control with high convenience cannot be performed.

Therefore, there is a need to provide an authentication system, an authentication method, and an information processing apparatus capable of easily performing authentication control with high convenience.

SUMMARY OF THE INVENTION

It is an object of the present invention to at least partially solve the problems in the conventional technology.

According to an embodiment, there is provided an authentication system includes a device; and an information processing apparatus connected to the device. The device includes a state management unit that manages an authentication state in the device and causes the device to enter a log-out state; and a first communication unit that transmits an authentication scheme available in the device to the information processing apparatus when the device enters the log-out state. The information processing apparatus includes a second communication unit that receives the authentication scheme; a generation unit that generates a log-in screen based on screen setting information corresponding to the received authentication scheme; and a display controller that controls to display the log-in screen on a display unit.

According to another embodiment, there is provided an authentication method performed in an authentication system that includes a device and an information processing apparatus connected to the device. The authentication method includes causing the device to enter a log-out state under management of an authentication state in the device; transmitting an authentication scheme available in the device to the information processing apparatus when the device enters the log-out state; receiving in the information processing apparatus the authentication scheme; generating a log-in screen based on screen setting information corresponding to the received authentication scheme; and displaying the log-in screen on a display unit.

According to still another embodiment, there is provided an information processing apparatus connected to a device including a state management unit that manages an authentication state in the device and causes the device to enter a log-out state, and a first communication unit that transmits an authentication scheme available in the device to the information processing apparatus when the device enters the log-out state. The information processing apparatus includes a second communication unit that receives the authentication scheme; a generation unit that generates a log-in screen based on screen setting information corresponding to the received authentication scheme; and a display controller that controls to display the log-in screen on a display unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a view illustrating an example of screen setting information;

DETAILED DESCRIPTION OF THE PREFERRED EMBODIMENTS

Hereinafter, embodiments of an authentication system, an authentication method, a computer program, an information processing apparatus, and a device will be described in detail with reference to the accompanying drawings. The authentication system includes the device and the information processing apparatus. The following describes the case where the device is applied to a multifunctional peripheral (MFP) as an example. The multifunction peripheral is a device having at least two functions of a printing function, a copying function, a scanner function, and a facsimile function. It should be noted that the device is not limited to the multifunction peripheral. For example, the device may be a device having any one function of the printing function, the copying function, the scanner function, and the facsimile function. Furthermore, the device may be a device having one or a plurality of functions other than these functions.

Figure 1:
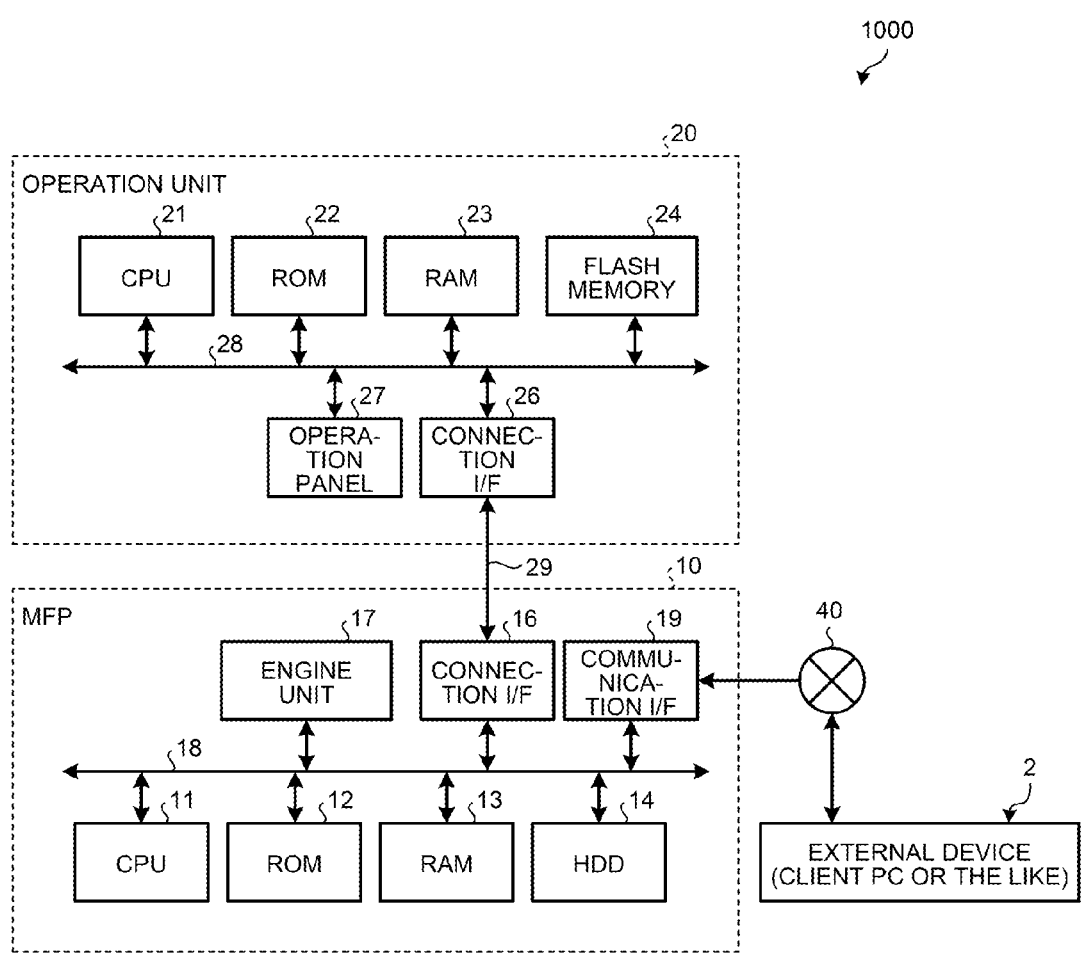
FIG. 1 is a block diagram illustrating an example of the hardware configuration of an authentication system.

FIG. 1 is a block diagram illustrating an example of the hardware configuration of an authentication system 1000 according to the embodiment. As illustrated in FIG. 1, the authentication system 1000 includes an MFP 10, an operation unit 20, and an external device 2. The MFP 10 and the operation unit 20 are connected to each other through a dedicated communication path 29 in a communicable manner. As the communication path 29, for example, a path of a universal serial bus (USB) standard can be used but it may be a path of an arbitrary standard regardless of wired and wireless paths. The communication path 29 may be a network such as the Internet, a telephone line, or the like. The external device 2 and the MFP 10 are connected to each other via a network 40 such as the Internet.

Although FIG. 1 illustrates the case where one operation unit 20 is connected to the MFP 10, the number of operation units 20 is not limited to one and is arbitrary. Furthermore, the number of MFPs 10 that are connected to the operation unit 20 is not also limited to one and is arbitrary.

The MFP 10 is a device capable of executing various types of functions, such as the copying function, the scanner function, the facsimile function, and the printer function. The operation unit 20 receives input in accordance with an operation by a user. The operation unit 20 includes a unique operating system (OS) and a screen transition mechanism although details thereof will be described later. The MFP 10 operates in accordance with the input received by the operation unit 20.

Next, the hardware configuration of the MFP 10 will be described. As illustrated in FIG. 1, the MFP 10 includes a central processing unit (CPU) 11, a read only memory (ROM) 12, a random access memory (RAM) 13, a hard disk drive (HDD) 14, a connection interface (I/F) 16, an engine unit 17, and a communication I/F 19 and they are connected to one another through a system bus 18.

The CPU 11 controls operations of the MFP 10 overall. The CPU 11 executes programs stored in the ROM 12, the HDD 14, or the like while using the RAM 13 as a work area so as to control the operations of the MFP 10 overall. In this manner, the CPU 11 executes the copying function, the scanner function, the facsimile function, and the printer function as described above, and various types of functions, which will be described later.

At least a state management unit, a scheme management unit, a first communication unit, and an authentication unit, which will be described later, among functional units (details thereof will be described later) for executing the respective functions may be made to operate by causing a processing device such as the CPU to execute programs, that is, by software, may be made to operate by hardware such as an integrated circuit (IC), or may be made to operate by the software and the hardware in combination.

The connection I/F 16 is an interface for communicating with the operation unit 20 through the communication path 29. The communication I/F 19 is an interface for communicating with the external device 2 via the network 40.

The engine unit 17 is hardware that performs general information processing and processing other than communication for executing the copying function, the scanner function, the facsimile function, and the printer function. For example, the engine unit 17 includes a scanner (image reading unit) that scans and reads an image on a document, a plotter (image formation unit) that performs printing on a sheet material such as paper, and a facsimile unit that performs facsimile communication. In addition, the engine unit 17 can also include specific options such as a finisher that sorts a sheet material on which printing has been performed and an automatic document feeder (ADF) that automatically feeds a document.

Next, the hardware configuration of the operation unit 20 will be described. As illustrated in FIG. 1, the operation unit 20 includes a CPU 21, a ROM 22, a RAM 23, a flash memory 24, a connection I/F 26, and an operation panel 27 and they are connected to one another through a system bus 28.

The CPU 21 controls operations of the operation unit 20 overall. The CPU 21 executes programs stored in the ROM 22, the flash memory 24, or the like while using the RAM 23 as a work area so as to control the operations of the operation unit 20 overall. In this manner, the CPU 21 executes various types of functions, which will be described later.

At least a display controller, a second communication unit, a generation unit, a changing unit, and a setting unit, which will be described later, among functional units (details thereof will be described later) for executing the respective functions may be made to operate by causing a processing device such as the CPU to execute the programs, that is, by software, may be made to operate by hardware such as an IC, or may be made to operate by the software and hardware in combination.

The connection I/F 26 is an interface for communicating with the MFP 10 through the communication path 29.

The operation panel 27 receives various types of inputs in accordance with operations by the user and displays various types of pieces of information and various types of images on a log-in screen, which will be described later. In this example, the operation panel 27 is configured by a liquid crystal display device (LCD) having a touch panel function but is not limited thereto. For example, the operation panel 27 may be configured by an organic electroluminescence (EL) display device having a touch panel function. In addition thereto or instead of it, an operation unit such as a hardware key and a display unit such as a lamp can be also provided. Although the operation panel 27 is configured to have both a receiving function of receiving various types of inputs and a display function of displaying various types of pieces of information integrally in the embodiment, the configuration of the operation panel 27 is not limited thereto. For example, the operation panel 27 may be configured by providing a device receiving various types of inputs and a device displaying various types of pieces of information as separate members.

Figure 2:
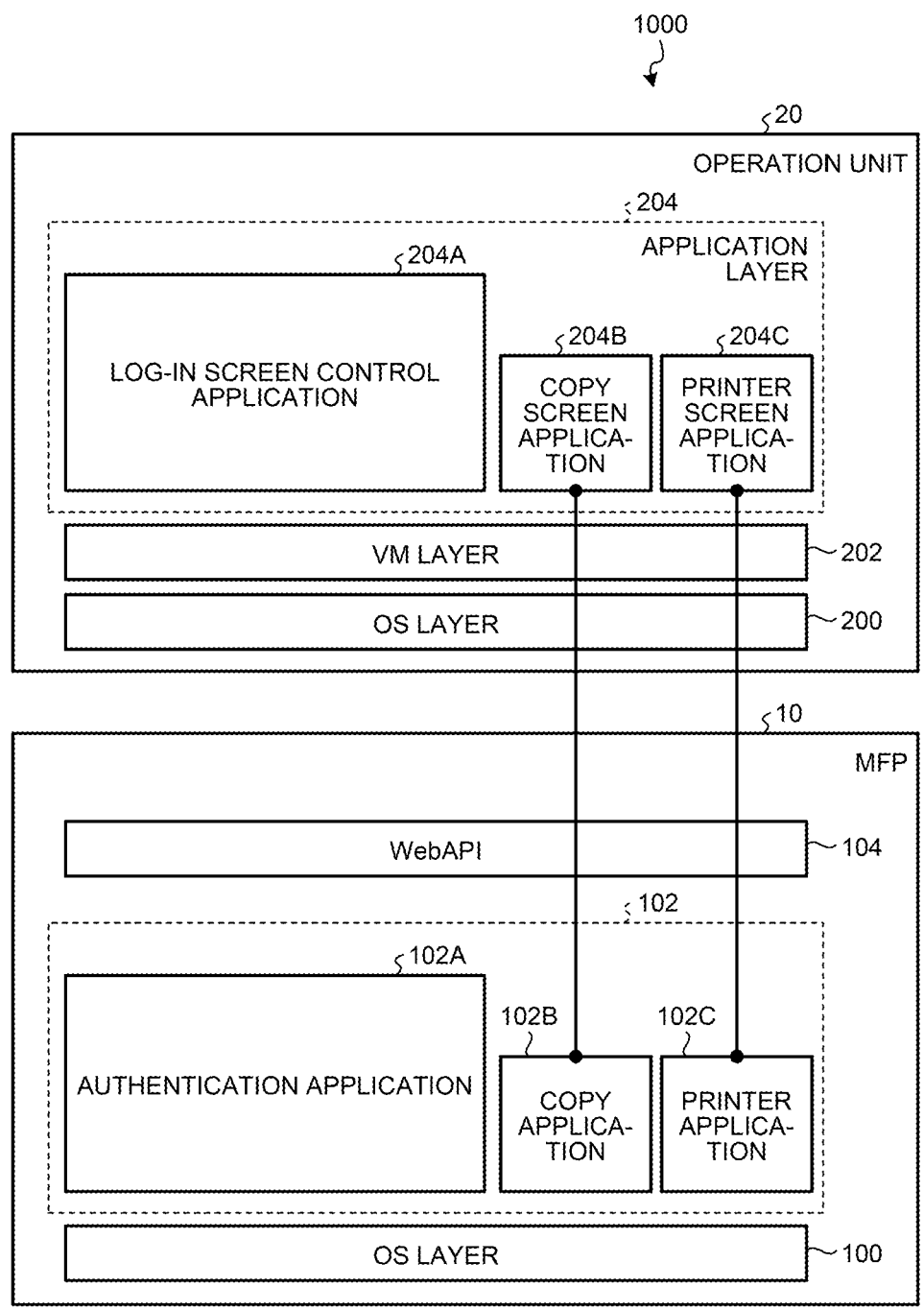
FIG. 2 is a schematic diagram illustrating an example of the software configurations of a multifunctional peripheral (MFP) and an operation unit.

Then, the software configurations of the operation unit 20 and the MFP 10 in the authentication system 1000 will be described. FIG. 2 is a schematic diagram illustrating an example of the software configurations of the operation unit 20 and the MFP 10.

As illustrated in FIG. 2, the MFP 10 includes an OS layer 100, a service layer (not illustrated), an application layer 102, and a WebAPI 104. The entities of the OS layer 100, the service layer, the application layer 102, and the WebAPI 104 are various types of pieces of software that are stored in the ROM 12, the HDD 14, or the like. The CPU 11 executes these pieces of software so as to provide various types of functions.

The pieces of software of the application layer 102 are pieces of application software (in the following description, referred to as "application" simply in some cases) for operating the hardware resources to provide predetermined functions. Examples of the applications include an authentication application 102A for providing an authentication control function, which will be described later, a copy application 102B for providing a copying function, and a printer application 102C for providing a printer function. Although not illustrated in the drawing, examples of the applications further include a scanner application for providing a scanner function, a facsimile application for providing a facsimile function, and a printer application for providing a printer function.

The software of the service layer is interposed between the application layer 102 and the OS layer 100 and is software for providing an interface for using the hardware resources included in the MFP 10 to the applications. To be more specific, the software of the service layer is software for providing functions of receiving operation requests for the hardware resources and mediating the operation requests. As the operation requests received by the service layer, requests for reading with the scanner, printing with the plotter, and the like are considered.

The interface function by the service layer is provided not only to the application layer 102 of the MFP 10 but also to an application layer 204 of the operation unit 20. That is to say, the application layer 204 (application) of the operation unit 20 can also execute functions using the hardware resources (for example, the engine unit 17) of the MFP 10 through the interface function of the service layer.

The software of the OS layer 100 is basic software (operating system) for providing a basic function of controlling the pieces of hardware included in the MFP 10. The software of the service layer converts usage requests for the hardware resources from various applications to commands that the OS layer 100 can interpret and delivers them to the OS layer 100. Then, the software of the OS layer 100 executes the commands, so that the hardware resources perform operations in accordance with the requests from the applications.

The WebAPI 104 can receive various types of requests from the application layer 102 and the operation unit 20 with a previously defined function such as parameter specification. Then, when the WebAPI 104 receives various types of requests with the function, the WebAPI 104 makes various types of requests to the application layer 102 and the operation unit 20. With this, the respective applications of the application layer 102 perform pieces of processing in accordance with the various types of requests received from the operation unit 20 through the WebAPI 104.

The operation unit 20 includes an OS layer 200, a virtual machine (VM) layer 202, and the application layer 204. The OS layer 200, the VM layer 202, and the application layer 204 included in the operation unit 20 have hierarchical structures that are the same as those in the MFP 10. Functions provided by applications of the application layer 204 and types of operation requests capable of being received by the VM layer 202 are different from those in the MFP 10. The applications of the application layer 204 may be pieces of software for operating the hardware resources included in the operation unit 20 to provide predetermined functions but are applications mainly for providing a user interface (UI) function for performing operations and display relating to the functions (copying function, scanner function, facsimile function, and printer function) included in the MFP 10, a UI function for performing operations and display relating to log-in, and the like.

Examples of the applications for providing the UI function for performing the operations and the display relating to the functions (copying function, scanner function, facsimile function, and printer function) included in the MFP 10 include a copy screen application 204B for providing a UI function relating to the copying function and a printer screen application 204C for providing a UI function relating to the printer function. Furthermore, as the application for providing the UI function for performing operations and display relating to the log-in, the operation unit 20 includes a log-in screen control application 204A in the embodiment.

The VM layer 202 corresponds to a service layer and is interposed between the OS layer 200 and the application layer 204. The application of the application layer 204 operates on the VM layer 202. The software of the VM layer 202 is Dalvik VM, for example.

In the embodiment, the software of the OS layer 100 in the MFP 10 and the software of the OS layer 200 in the operation unit 20 are different from each other in order to ensure independency of the functions. That is to say, the MFP 10 and the operation unit 20 operate independently by different operating systems. For example, Linux (registered trademark) can be used as the software of the OS layer 100 in the MFP 10 whereas Android (registered trademark) can be used as the software of the OS layer 200 in the operation unit 20.

As described above, in the authentication system 1000 in the embodiment, the MFP 10 and the operation unit 20 operate by different operating systems. Communication between the MFP 10 and the operation unit 20 is performed not as process-to-process communication in a common apparatus but as communication between different apparatuses. The communication corresponds to an operation (command communication) in which input (instruction content from the user) received by the operation unit 20 is transmitted to the MFP 10, an operation in which the MFP 10 notifies the operation unit 20 of an event, and the like. In this example, the operation unit 20 makes the command communication with the MFP 10 so as to use the functions of the MFP 10. Furthermore, the event that the MFP 10 notifies the operation unit 20 includes an execution state of an operation in the MFP 10 and contents set in the MFP 10.

In the embodiment, electric power is supplied to the operation unit 20 from the MFP 10 through the communication path 29. Note that power supply control of the operation unit 20 and power supply control of the MFP 10 may be performed separately (independently).

Figure 3:
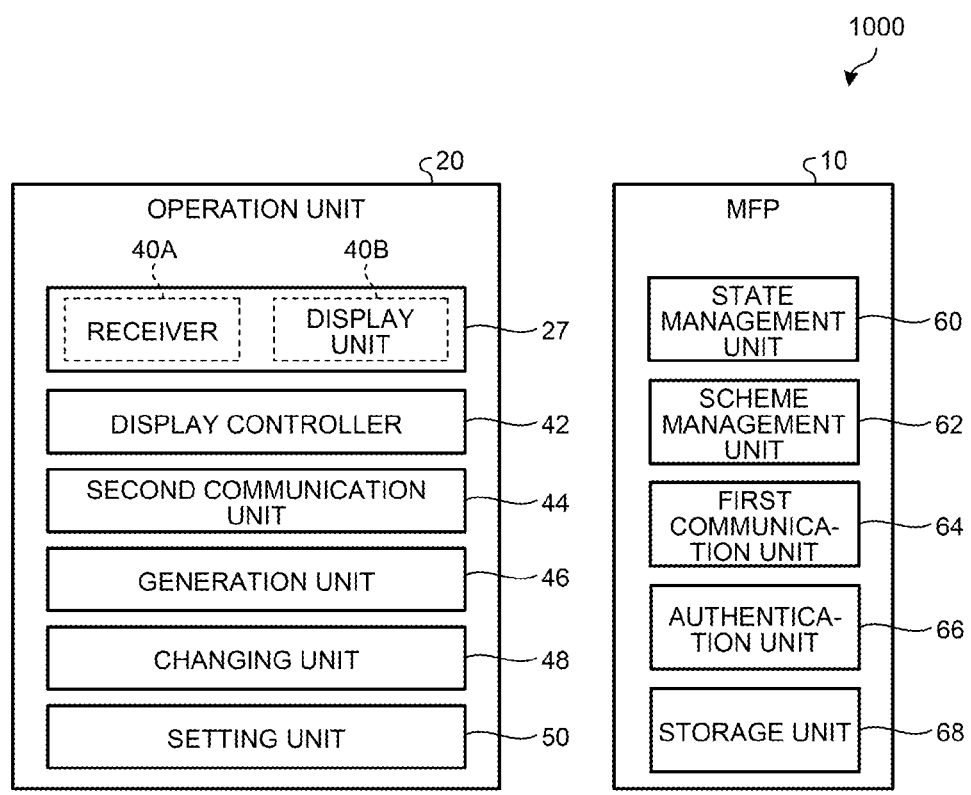
FIG. 3 is a diagram illustrating an example of the functional configurations of the MFP and the operation unit.

Next, the functional configurations of the MFP 10 and the operation unit 20 will be described. FIG. 3 is a diagram illustrating an example of the functional configurations of the MFP 10 and the operation unit 20 in the embodiment.

The following mainly describes the function relating to authentication control processing that is executed in the authentication system 1000.

The authentication control processing is processing of controlling the MFP 10 to be in a log-in state where the user can use the MFP 10 or a log-out state where the user cannot use the MFP 10. In the embodiment, it is supposed that even when the operation unit 20 previously has a function of performing control of the log-in state and the log-out state, the operation unit 20 does not use the function.

First, the functions of the MFP 10 will be described. As illustrated in FIG. 3, the MFP 10 includes a state management unit 60, a scheme management unit 62, a first communication unit 64, a storage unit 68, and an authentication unit 66.

The state management unit 60 manages an authentication state in the MFP 10. To be specific, the state management unit 60 manages whether the MFP 10 is in the log-in state or the log-out state. To be more specific, the state management unit 60 causes the MFP 10 in the log-in state to enter the log-out state. Then, the state management unit 60 changes information indicating a state that is stored in a memory (not illustrated) to information indicating the log-in state. Furthermore, the state management unit 60 causes the MFP 10 in the log-out state to enter the log-in state. Then, the state management unit 60 changes information indicating a state that is stored in the memory (not illustrated) to information indicating the log-out state. The state management unit 60 manages the authentication state with these pieces of processing.

What the MFP 10 is made to enter the log-out state indicates that the MFP 10 is made into a state of receiving no request from the operation unit 20. What the MFP 10 is made to enter the log-in state indicates that the MFP 10 is made into a state of being capable of receiving various types of requests from the operation unit 20. Details of shift timings thereof will be described in detail later.

The scheme management unit 62 manages authentication schemes of one or a plurality of type(s) that the MFP 10 can employ. Examples of the authentication schemes include a manual scheme, a card scheme, and a combination of these schemes but the authentication scheme is not limited thereto. The manual scheme is a scheme causing a user to directly input user information including user identification information and a password through the operation panel 27. The card scheme is a scheme reading user information stored in an electronic medium such as an IC card and a magnetic card using a dedicated reading device.

The scheme management unit 62 previously stores therein specification information specifying the authentication scheme for display on the operation unit 20 among one or a plurality of types of authentication scheme(s) is(are) managed. The specification information can be changed appropriately with an operation instruction by the user through the input unit (not illustrated) provided on the MFP 10. In the embodiment, the scheme management unit 62 previously stores therein specification information indicating a combination of the manual scheme and the card scheme, as an example.

When the state management unit 60 causes the MFP 10 to enter the log-out state, the scheme management unit 62 transmits the authentication scheme that is specified by the specification information to the first communication unit 64.

The first communication unit 64 transmits and receives signals and various types of pieces of information to and from the operation unit 20. In the embodiment, when the state management unit 60 causes the MFP 10 to enter the log-out state, the first communication unit 64 transmits a log-in screen display request containing the authentication scheme that is specified by the specification information and a log-in screen display instruction to the operation unit 20.

To be specific, when the state management unit 60 causes the MFP 10 to enter the log-out state, the first communication unit 64 transmits an authentication scheme inquiry request to the scheme management unit 62. Then, the first communication unit 64 receives the authentication scheme specified by the specification information among the authentication schemes that are managed by the scheme management unit 62 from the scheme management unit 62. Thereafter, the first communication unit 64 transmits the log-in screen display request containing the authentication scheme and the log-in screen display instruction to the operation unit 20.

When the state management unit 60 causes the MFP 10 to enter the log-in state, the first communication unit 64 transmits to the operation unit 20 a display change request containing an instruction to change the log-in screen.

The storage unit 68 stores therein various types of pieces of information. In the embodiment, the storage unit 68 stores therein user management information in which pieces of user information of users capable of using the MFP 10 and pieces of authority information indicating applications capable of being used by the users specified by the pieces of user information are made to correspond to each other previously. The applications are the copy application 102B, the printer application 102C, and the like (see FIG. 2), for example.

The user information contains user identification information capable of identifying the user and a password. The user information may contain only the user identification information capable of identifying the user. It is sufficient that the user identification information can identify the user uniquely. The user identification information is a user name, a number that can specify the user, or the like. The user management information can be changed appropriately with an operation instruction by the user through the operation unit (not illustrated) of the MFP 10.

The authentication unit 66 executes user authentication processing. The user authentication processing is processing of determining whether the user information contained in an authentication request received from the operation unit 20 through the state management unit 60 is registered in the user management information stored in the storage unit 68. When the user information contained in the authentication request is registered in the user management information stored in the storage unit 68, the authentication unit 66 creates an authentication result containing authentication normality and authority information corresponding to the user information. On the other hand, when the user information contained in the authentication request is not registered in the user management information stored in the storage unit 68, the authentication unit 66 creates an authentication result containing authentication abnormality.

Next, the operation unit 20 will be described. The operation unit 20 includes a receiver 40A, a display unit 40B, a display controller 42, a second communication unit 44, a generation unit 46, a changing unit 48, and a setting unit 50.

The receiver 40A receives various types of inputs. In this example, the receiver 40A receives inputs of various types of pieces of information with a touch operation by the user onto a screen (screen displaying an image) of the operation panel 27 having the touch panel function.

The display unit 40B displays various types of images. In the embodiment, the display unit 40B displays a log-in screen, a home screen, and the like. The log-in screen is a screen that is displayed on the display unit 40B when a log-in operation by the user can be received. The home screen is a screen that is displayed on the display unit 40B first after the user logs in the MFP 10 through the log-in screen.

The second communication unit 44 transmits and receives various types of pieces of information and various types of signals to and from the MFP 10. In the embodiment, the second communication unit 44 receives the log-in screen display request from the MFP 10. The log-in screen display request contains the authentication scheme as described above.

The setting unit 50 stores therein (pieces of) screen setting information corresponding to the authentication scheme(s) of one or a plurality of type(s). The setting unit 50 previously stores therein the pieces of screen setting information corresponding to at least the respective authentication schemes of all the types available in the MFP 10. The screen setting information is information indicating characters, images, button images to be selected when instructions to execute various types of pieces of processing are made, and a layout of these characters and images that are contained in the screen displayed on the display unit 40B.

FIG. 4 is a view illustrating an example of the screen setting information. The screen setting information as illustrated in FIG. 4 is an example of the screen setting information corresponding to the combination of the card scheme and the manual scheme. In the example as illustrated in FIG. 4, the screen setting information is described by extensible markup language (XML) but is not limited to the description.

Returning back to FIG. 3, the generation unit 46 generates the log-in screen and the home screen. Upon reception of the authentication scheme from the MFP 10 through the second communication unit 44, the generation unit 46 reads the screen setting information corresponding to the received authentication scheme from the setting unit 50. Then, the generation unit 46 analyzes the read screen setting information and generates the log-in screen.

When the generation unit 46 receives the display change request, the generation unit 46 reads the authentication normality and the authority information as the authentication result contained in the display change request and generates the home screen. The generation unit 46 generates a home screen containing a button image for directing to execute the application specified by the authority information as the home screen.

The display controller 42 controls to display various types of images of the log-in screen and the home screen generated by the generation unit 46 on the display unit 40B.

The changing unit 48 changes the screen setting information set to the setting unit 50 and registers a new authentication scheme or screen setting information corresponding to the new authentication scheme in the setting unit 50. When the changing unit 48 receives change or registration of the screen setting information with an operation instruction by the user through the operation panel 27, the changing unit 48 changes the screen setting information registered in the setting unit 50 or registers the new screen setting information in accordance with input contents input through the operation panel 27.

Next, authentication processing that is executed in the authentication system 1000 in the embodiment will be described.

Figure 5:
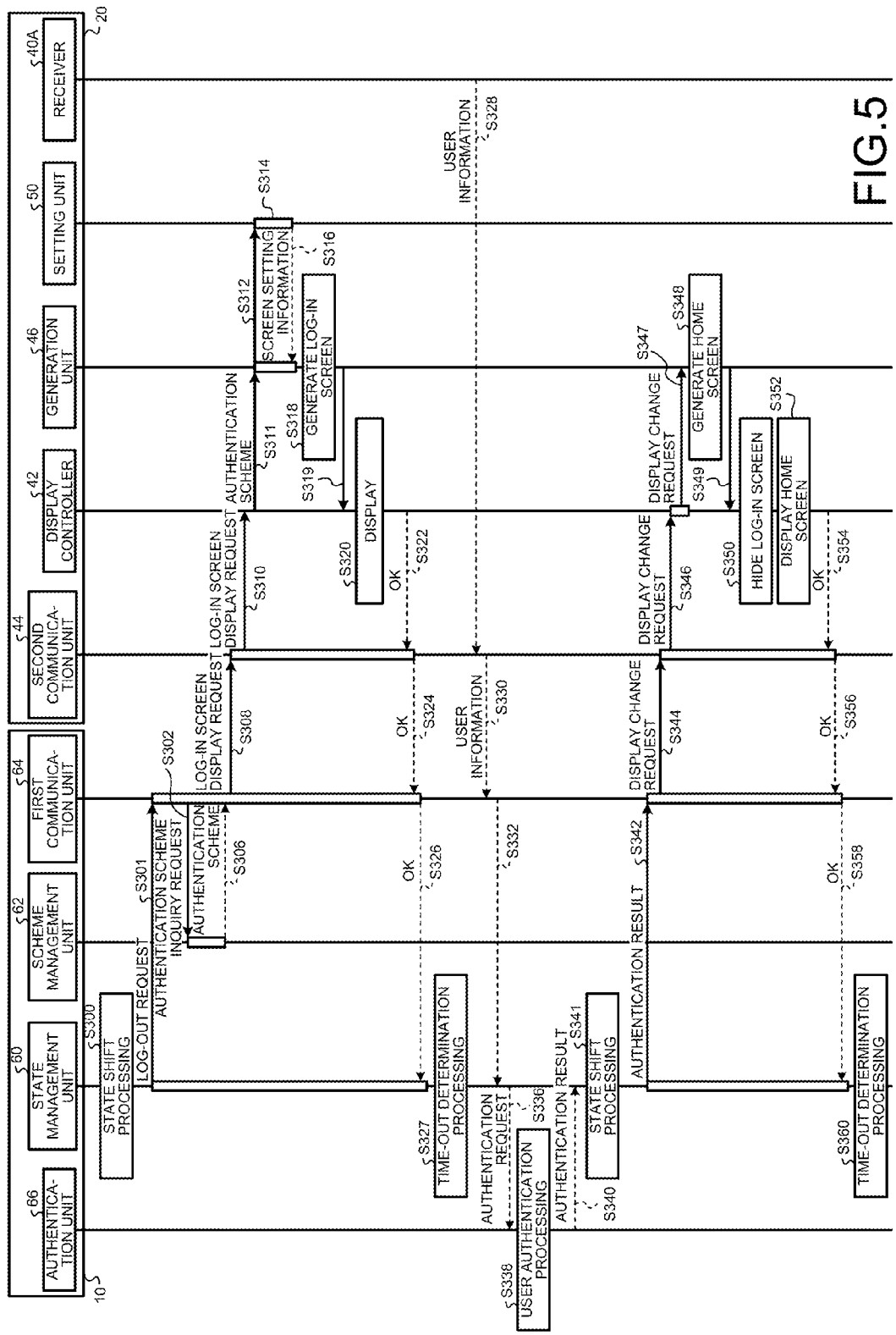
FIG. 5 is a sequence diagram illustrating procedures of authentication processing.

FIG. 5 is a sequence diagram illustrating procedures of the authentication processing in the authentication system 1000.

First, when the state management unit 60 executes state shift processing (step S300), the authentication system 1000 executes pieces of processing at step S301 and subsequent steps as illustrated in FIG. 5.

The state management unit 60, first, determines whether a log-out instruction has been made with an operation instruction by the user through the operation unit (not illustrated) of the MFP 10, whether it has received a log-out request from the operation unit 20, or whether time-out has been detected in the MFP 10 at step S300.

The log-out request from the operation unit 20 is transmitted from the operation unit 20 to the MFP 10 when log-out is directed with the operation instruction by the user through the operation unit 20. The state management unit 60 determines whether it has received the log-out request from the operation unit 20 through the first communication unit 64.

The determination whether the time-out has been detected is made as follows. That is, the state management unit 60 determines whether passage time during which it receives no signal from any of the operation unit 20, the external device 2, and the operation unit (not illustrated) provided on the MFP 10 from previous reception of any signal or information from any of them exceeds a certain period of time.

When the state management unit 60 has received the log-out instruction or the log-out request or when the time-out has been detected, it causes the MFP 10 to enter the log-out state, and then, transmits the log-out request to the first communication unit 64 (step S301).

Upon reception of the log-out request from the state management unit 60, the first communication unit 64 transmits an authentication scheme inquiry request to the scheme management unit 62 (step S302).

The scheme management unit 62 that has received the authentication scheme inquiry request transmits an authentication scheme specified by the specification information among the authentication scheme(s) of one or the plurality of type(s) that are managed thereby to the first communication unit 64 (step S306).

The first communication unit 64 transmits a log-in screen display request containing the authentication scheme received from the scheme management unit 62 and a log-in screen display instruction to the operation unit 20 (step S308).

Upon reception of the log-in screen display request from the MFP 10, the second communication unit 44 of the operation unit 20 transmits the received log-in screen display request to the display controller 42 (step S310). The display controller 42 transmits the authentication scheme contained in the log-in screen display request to the generation unit 46 (step S311).

The generation unit 46 reads screen setting information corresponding to the received authentication scheme from the setting unit 50 (step S312, step S314, and step S316). Subsequently, the generation unit 46 analyzes the read screen setting information and generates a log-in screen (step S318). Then, the generation unit 46 transmits the generated log-in screen to the display controller 42 (step S319).

The display controller 42 controls to display the log-in screen received from the generation unit 46 on the display unit 40B of the operation panel 27 (step S320).

Figure 6:
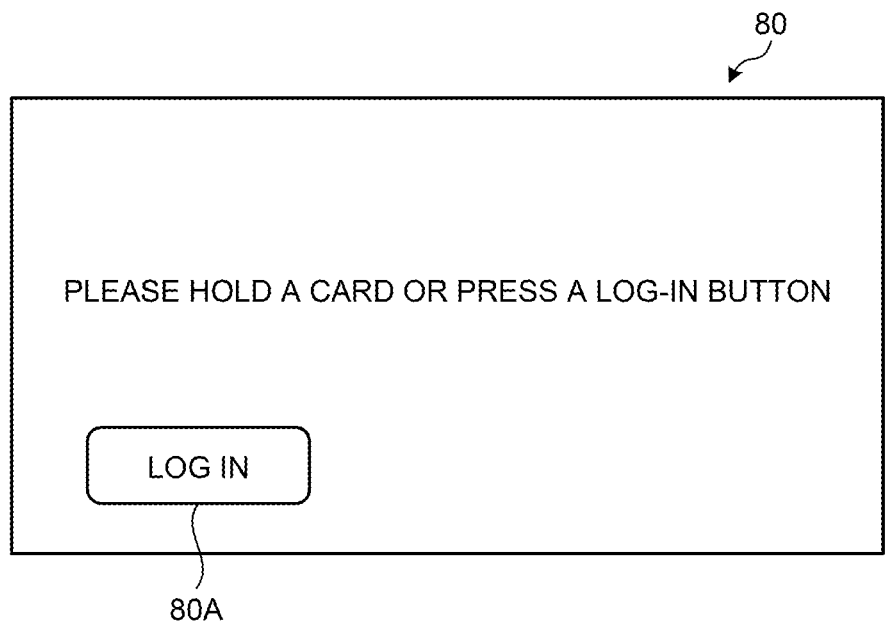
FIG. 6 is a view illustrating an example of a log-in screen.

FIG. 6 is a view illustrating an example of a log-in screen 80 that is controlled to be displayed by the display controller 42. The example as illustrated in FIG. 6 is an example of the log-in screen 80 that is generated based on the screen setting information corresponding to the card scheme and the manual scheme as the authentication schemes.

For example, the log-in screen 80 contains characters "please hold a card or press a log-in button" for urging the user to make authentication with the card scheme or authentication with the manual scheme and a log-in button 80A that is used for instruction when the user selects transition to an input screen with the manual scheme.

Returning back to FIG. 5, when the display controller 42 controls to display the log-in screen, it transmits an "OK" signal indicating display of the log-in screen to the MFP 10 through the second communication unit 44 (step S322, step S324).

Upon reception of the "OK" signal from the operation unit 20, the first communication unit 64 of the MFP 10 transmits the "OK" signal to the state management unit 60 (step S326).

The state management unit 60 executes time-out determination processing (step S327). At step S327, the state management unit 60 determines whether a reception timing of the "OK" signal received from the operation unit 20 through the first communication unit 64 is a timing at which a certain period of time has elapsed after the transmission of the log-out request to the first communication unit 64 at step S301. Then, when the state management unit 60 determines that the reception timing is the timing at which the certain period of time has elapsed, the state management unit 60 causes the MFP 10 to enter a lock state where it does not receive requests and various types of instructions from the operation unit 20. On the other hand, when the state management unit 60 determines that the reception timing is not the timing at which the certain period of time has elapsed, it does not cause the MFP 10 to enter the lock state and continues the processing.

The processing at step S320 makes a state where the log-in screen is displayed on the operation panel 27 (display unit 40B) of the operation unit 20. The user performs an operation in accordance with the authentication scheme transmitted from the MFP 10 through the log-in screen and inputs user information. For example, the user directly inputs the user information through the log-in screen. Then, the receiver 40A receives the user information.

The receiver 40A transmits the received user information to the MFP 10 through the second communication unit 44 (step S328 and step S330).

Upon reception of the user information from the operation unit 20, the first communication unit 64 of the MFP 10 transmits the user information to the state management unit 60 (step S332).

Upon reception of the user information from the operation unit 20 through the first communication unit 64, the state management unit 60 transmits an authentication request for the user information to the authentication unit 66 (step S336). The authentication request contains the user information received from the operation unit 20 and an authentication instruction.

Upon reception of the authentication request, the authentication unit 66 executes the user authentication processing for the user information contained in the authentication request (step S338). To be specific, when the user information contained in the authentication request is registered in the user management information stored in the storage unit 68, the authentication unit 66 creates an authentication result containing authentication normality and authority information corresponding to the user information. On the other hand, when the user information contained in the authentication request is not registered in the user management information stored in the storage unit 68, the authentication unit 66 creates an authentication result containing authentication abnormality.

Subsequently, the authentication unit 66 transmits the created authentication result to the state management unit 60 (step S340).

Upon reception of the authentication result, the state management unit 60 executes the state shift processing (step S341). At step S341, the state management unit 60 determines whether the authentication result received from the authentication unit 66 contains the authentication abnormality or the authentication normality. When the authentication result contains the authentication abnormality, the state management unit 60 keeps the MFP 10 to be in the log-out state. On the other hand, when the authentication result contains the authentication normality, the state management unit 60 causes the MFP 10 to enter the log-in state from the log-out state.

Thereafter, the state management unit 60 transmits the authentication result received from the authentication unit 66 to the first communication unit 64 (step S342). The first communication unit 64 transmits a display change request containing the received authentication result and a display change instruction to the operation unit 20 (step S344).

Upon reception of the display change request, the second communication unit 44 of the operation unit 20 transmits the received display change request to the display controller 42 (step S346).

When the display change request contains the authentication normality and the authority information, the display controller 42 that has received the display change request transmits the display change request to the generation unit 46 (step S347). The generation unit 46 reads the authority information contained in the display change request and generates a home screen containing a button image for directing to activate an application that is specified by the authority information (step S348). Then, the generation unit 46 transmits the generated home screen to the display controller 42 (step S349).

Upon reception of the home screen from the generation unit 46, the display controller 42 controls to hide the log-in screen displayed on the operation panel 27 (display unit 40B) (step S350) and controls to display the received home screen on the operation panel 27 (display unit 40B) (step S352). Then, the display controller 42 transmits an "OK" signal indicating display of the home screen to the MFP 10 through the second communication unit 44 (step S354 and step S356).

Upon reception of the "OK" signal from the operation unit 20, the first communication unit 64 of the MFP 10 transmits the received "OK" signal to the state management unit 60 (step S358).

On the other hand, when the display change request contains the authentication abnormality, the display controller 42 that has received the display change request with the above-mentioned processing at step S346 does not perform the pieces of processing at step S347 to step S358. That is to say, the operation panel 27 (display unit 40B) still displays the log-in screen and the "OK" signal is not transmitted to the MFP 10.

When the display change request contains the authentication abnormality, the display controller 42 that has received the display change request with the above-mentioned processing at step S346 may control to display an image indicating a log-in error on the display unit 40B instead of the pieces of step S347 to step S358. Also in this case, no signal is transmitted to the MFP 10 from the operation unit 20.

Thereafter, the state management unit 60 executes the time-out determination processing (step S360). At step S360, the state management unit 60 determines whether the reception timing of the "OK" signal received from the operation unit 20 through the first communication unit 64 is a timing at which the certain period of time has elapsed after the transmission of the authentication result to the first communication unit 64 at step S342. When the state management unit 60 determines that the reception timing is the timing at which the certain period of time has elapsed, the state management unit 60 causes the MFP 10 to enter the log-out state. Then, the process returns to the above-mentioned step S300.

When the MFP 10 has been already in the log-out state, the MFP 10 keeps to be in the log-out state and the process returns to the above-mentioned step S300.

In the processing at step S360, also in the case where no signal is returned from the operation unit 20 even if the certain period of time has elapsed after the transmission of the authentication result to the first communication unit 64 at step S342, the state management unit 60 causes the MFP 10 to enter the log-out state, and then, the process is returned to the above-mentioned step S300.

On the other hand, when the state management unit 60 determines that the reception timing of the "OK" signal received from the operation unit 20 through the first communication unit 64 is the timing within the certain period of time after the transmission of the authentication result to the first communication unit 64 at step S342, it does not cause the MFP 10 to enter the log-out state and continues the processing. When it is determined that the certain period of time has not elapsed by the time-out determination processing at step S360, the MFP 10 keeps a state of being capable of receiving various types of instructions from the operation unit 20.

As described above, in the authentication system 1000 in the embodiment, the MFP 10 as the device includes the state management unit 60 and the first communication unit 64. The state management unit 60 causes the MFP 10 to enter the log-out state where the user cannot use the MFP 10. When the MFP 10 enters the log-out state, the first communication unit 64 transmits the authentication scheme available in the MFP 10 to the operation unit 20 as the information processing apparatus. Furthermore, in the authentication system 1000, the operation unit 20 as the information processing apparatus includes the second communication unit 44, the display controller 42, and the generation unit 46. The second communication unit 44 receives the authentication scheme from the MFP 10. The generation unit 46 generates the log-in screen based on the screen setting information corresponding to the authentication scheme received by the second communication unit 44. The display controller 42 controls to display the log-in screen on the display unit 40B.

Thus, in the authentication system 1000, the state management unit 60 of the MFP 10 manages the authentication state of the MFP 10. When the MFP 10 enters the log-out state, the state management unit 60 of the MFP 10 transmits the authentication scheme that is available in the MFP 10 to the operation unit 20. Then, when the operation unit 20 receives the authentication scheme from the MFP 10, it controls to display the log-in screen generated using the screen setting information corresponding to the authentication scheme on the display unit 40B.

Accordingly, the authentication system 1000 in the embodiment can perform authentication control with high convenience.

In the authentication system 1000 in the embodiment, a natural log-in screen cooperating with the MFP 10 is displayed on the operation unit 20.

In the authentication system 1000 in the embodiment, the authentication control can be performed while an application installed on the operation unit 20 does not control the log-in state. Furthermore, in the authentication system 1000, even when the operation unit 20 previously has a function of controlling the log-in state and the log-out state, the operation unit 20 can perform the authentication control without using the function.

In the MFP 10, the scheme management unit 62 manages the plurality of types of authentication schemes that is available in the MFP 10 and the specification information specifying the authentication scheme previously set as a display target. When the MFP 10 enters the log-out state, the scheme management unit 62 transmits the authentication scheme specified by the specification information to the operation unit 20.

With this configuration, the plurality of types of authentication schemes is available without being limited to an authentication scheme of one type.

In addition, the operation unit 20 previously sets the pieces of screen setting information corresponding to the plurality of types of authentication schemes and generates the log-in screen using the screen setting information corresponding to the authentication scheme received from the MFP 10. This configuration enables the operation unit 20 to easily generate and display the log-in screen in accordance with the authentication scheme that is available in the MFP 10.

When the authentication result of the user information that has been input through the log-in screen is the authentication normality, the state management unit 60 of the MFP 10 causes the MFP 10 to enter the log-in state from the log-out state. This configuration enables the state management unit 60 to cause the MFP 10 to enter the log-in state from the log-out state in accordance with the user information received from the operation unit 20.

When the MFP 10 enters the log-in state, the MFP 10 transmits to the operation unit 20 the display change request containing an instruction to change the log-in screen. With the transmission of the display change request, the screen that is displayed on the operation unit 20 can be changed in accordance with the shift timing of the MFP 10 to the log-in state.

Various types of pieces of information (user management information, authentication scheme, and the like) that are previously stored in the authentication system 1000 in the embodiment may be stored in a server device (not illustrated) connected to the network 40 or a recording medium such as an external hard disk.

It is needless to say that a system configuration in which the MFP 10 and the operation unit 20 are connected in the authentication system 1000 as described in the embodiment is an example and various system configuration examples can be employed in accordance with applications and objects.

Computer Program

Computer programs that are executed in the authentication system 1000 in the above-mentioned embodiment may be recorded and provided in a computer-readable recording medium such as a compact disc read only memory (CD-ROM), a flexible disk (FD), a compact disc recordable (CD-R), a digital versatile disc (DVD), and a universal serial bus (USB) memory, as an installable or executable file, or may be provided or distributed via a network such as the Internet. Furthermore, various types of programs may be embedded and provided in a ROM, for example.

According to an embodiment, log-in control with high convenience can be performed easily.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the device. Alternatively, the HDD may be provided outside of the device as long as the HDD is accessible. In this example, the CPU, such as a cache memory of the CPU, and the RAM may function as a physical memory or a primary memory of the device, while the HDD may function as a secondary memory of the device.

What is claimed is:

1. An authentication system comprising:
   a device including at least one first memory and at least one first processor, the first memory having computer readable instructions stored thereon; and
   an information processing apparatus connected to the device, the information processing apparatus including at least one second memory and at least one second processor, the second memory having computer readable instructions stored thereon, wherein
      the at least one first processor is configured to execute the computer readable instructions stored in the first memory to,
         manage an authentication state in the device, manage a plurality of authentication schemes available in the device,
         store specification information which specifies at least one of the plurality of authentication schemes being previously set as a display target, and
         transmit to the information processing apparatus the at least one of the plurality of authentication schemes specified by the specification information when the device enters a log-out state,
      the at least one second processor configured to execute the computer readable instructions stored in the second memory to,
         receive the at least one of the plurality of authentication schemes,
         generate a log-in screen based on screen setting information corresponding to the received authentication scheme; and
         display on a display device the generated log-in screen, the generated log-in screen being based on screen setting information which corresponds to the received at least one of the plurality of authentication schemes.

2. The authentication system according to claim 1, wherein the at least one second processor is further configured to execute the computer readable instructions stored in the second memory to,
   set pieces of screen setting information corresponding to at least one of the plurality of authentication schemes available in the device, and
   read at least one of the pieces of screen setting information corresponding to the received at least one of the plurality of authentication schemes for the generated log-in screen.

3. The authentication system according to claim 1, wherein
   the at least one second processor is further configured to execute the computer readable instructions stored in the second memory to,
      receive user information inputted through the log-in screen, and
      transmit the user information to the device; and
   the at least one first processor is further configured to execute the computer readable instructions stored in the first memory to,
      authenticate a user identified by the user information, and
      enter the device into a log-in state from the log-out state when the user is authenticated.

4. The authentication system according to claim 2, wherein
   the at least one second processor is further configured to execute the computer readable instructions stored in the second memory to,
      receive user information inputted through the log-in screen, and
      transmit the user information to the device; and
   the at least one first processor is further configured to execute the computer readable instructions stored in the first memory to,
      authenticate a user identified by the user information, and
      enter the device into a log-in state from the log-out state when the user is authenticated.

5. The authentication system according to claim 3, wherein
   the at least one first processor is further configured to execute the computer readable instructions stored in the first memory to,
      transmit to the information processing apparatus a display change request containing an instruction to change the log-in screen when the device enters the log-in state, the at least one second processor is further configured to execute the computer readable instructions stored in the second memory to,
control the display device to hide the log-in screen when the display change request is received.

6. The authentication system according to claim 1, wherein
the at least one first processor is further configured to execute the computer readable instructions stored in the first memory to,
enter the device into the log-out state (i) when a certain period of time has elapsed after a first communication between the at least one first processor and the information processing apparatus, (ii) when the at least one first processor receives a log-out request from the information processing apparatus, or (iii) when a certain period of time has elapsed after execution of a desired processing by the device.

7. An authentication method performed in an authentication system, the authentication system including a device and an information processing apparatus connected to the device, the authentication method comprising:
receiving, using at least one processor, from the device at least one of a plurality of authentication schemes available in the device when the device enters a log-out state, the at least one of the plurality of authentication schemes being specified by specification information as being previously set as a display target amongst the plurality of authentication schemes; and
generating, using the at least one processor, a log-in screen based on screen setting information corresponding to the received authentication scheme; and
displaying, using the at least one processor, the generated log-in screen on a display device, the generated log-in screen being based on screen setting information which corresponds to the at least one of the plurality of authentication schemes transmitted to the information processing apparatus.

8. The authentication method according to claim 7, further comprising:
setting, using the at least one processor, pieces of screen setting information corresponding to at least one of the plurality of authentication schemes available in the device; and
reading, using the at least one processor, at least one of the pieces of screen setting information corresponding to the received at least one of the plurality of authentication schemes for the generated log-in screen.

9. The authentication method according to claim 7, further comprising:
receiving, using the at least one processor, user information inputted through the log-in screen;
transmitting, using the at least one processor, the user information to the device;
authenticating, using the at least one processor, a user identified by the user information when the device receives the user information; and
causing, using the at least one processor, the device to enter into a log-in state from the log-out state when the user is authenticated.

10. The authentication method according to claim 8, further comprising:
receiving, using the at least one processor, user information inputted through the log-in screen;
transmitting, using the at least one processor, the user information to the device;
authenticating, using the at least one processor, a user identified by the user information when the device receives the user information; and
causing, using the at least one processor, the device to enter into a log-in state from the log-out state when the user is authenticated.

11. The authentication method according to claim 9, further comprising:
receiving, using the at least one processor, a display change request containing an instruction to change the log-in screen when the device enters the log-in state; and
controlling, using the at least one processor, the display device to hide the log-in screen when the display change request is received.

12. The authentication method according to claim 7, wherein the device enters the log-out state, using the at least one processor, (i) when a certain period of time has elapsed after a first communication between the device and the information processing apparatus, (ii) when the device receives a log-out request from the information processing apparatus, or (iii) when a certain period of time has elapsed after execution of a desired processing by the device.

13. A device comprising:
a memory having computer readable instructions stored thereon; and
at least one processor configured to execute the computer readable instructions stored in the first memory to,
manage an authentication state in the device,
manage a plurality of authentication schemes in the device,
store specification information which specifies at least one of the plurality of authentication schemes being previously set as a display target, and
transmit to an information processing apparatus the at least one of the plurality of authentication schemes specified by the specification information when the device enters a log-out state, the information processing apparatus configured to (i) generate a log-in screen based on screen setting information corresponding to the at least one of the plurality of authentication schemes transmitted by the device, and (ii) display the generated log-in screen on a display device, the generated log-in screen based on the screen setting information.

14. The device according to claim 13, wherein the at least one processor is further configured to execute the computer readable instructions to,
transmit to the information processing apparatus a display change request containing an instruction to change the log-in screen when the device enters a log-in state.

15. The device according to claim 13, wherein the at least one processor is further configured to execute the computer readable instructions to,
enter the device into the log-out state (i) when a first certain period of time has elapsed after a first communication between the at least one processor and the information processing apparatus, (ii) when the least one processor receives a log-out request from the information processing apparatus, or (iii) when a second certain period of time has elapsed after execution of a desired processing by the device.

16. The device according to claim 13, wherein the at least one processor is further configured to execute the computer readable instructions to,
transmit to the information processing apparatus the at least one of the plurality of authentication schemes based on an operation instruction entered by a user on the information processing apparatus.

17. The device according to claim 13, wherein the specification information includes at least one of a manual scheme and a card scheme.

18. The device according to claim 17, wherein the manual scheme includes inputting user information on the information processing apparatus.

19. The device according to claim 17, wherein the card scheme includes reading user information stored in an electronic medium.

20. The device according to claim 13, wherein the at least one processor is further configured to execute the computer readable instructions to change the specification information based on an operation instruction received by a user.

* * * * *